Patented Apr. 5, 1938

2,112,966

UNITED STATES PATENT OFFICE 2,112,966

DECOMPOSITION OF TITANIUM ORES

Ignace J. Krchma, Elmhurst, Del., assignor to E. I. du Pont de Nemours & Company, Wilmington, Del., a corporation of Delaware No Drawing. Application April 2, 1937,
Serial No. 134,683

14 Claims. (Cl. 75—115)

This invention relates to a process for producing soluble titanium compounds from titanium ores, and more particularly to an improved process for preparing a soluble titanium sulfate-containing mass from ilmenite, employing sulfuric acid as a solubilizing reagent.

In the decomposition of titanium ore, such as coarse beach sand ilmenite, with sulfuric acid, a certain portion of the reacting materials remains unconverted. In an effort to overcome this, it has been proposed to dry, grind and pulverize the ore previous to acid attack, or to employ an added reducing agent to promote conversion. Neither expedient has completely overcome the difficulty, since incomplete conversion still persists and undue acid losses still result. By reason of contact with the ilmenite, the unconverted acid is unfit for reuse, except as a diluent, due to contamination with impurities from the ore and further degradation to less than 25% strength during subsequent leaching of the attack mass.

I have discovered that if a combination of simple conditions is observed during ore attack, excellent and increased yields with relatively complete conversions to iron sulfate and basic titanium sulfate will result. I have also found that these results can be obtained without any pretreatment of the ore, such as drying, grinding, pulverizing, or utilization of added agents. These results I attain with remarkably low acid consumption, which is a very important and desirable feature in the decomposition of titanium ores, since the acid is by far the more costly ingredient.

Accordingly, it is among the objects of my invention to provide a process by means of which a wet or dry titanium ore in a relatively coarse state of division can be effectively and economically decomposed with sulfuric acid. It is a further object of my invention to provide a process which is simple and economical and which leads to the production of attack masses which contain relatively little or no unreacted acid. An additional object of the invention includes the provision of a process from which high and increased yields and almost complete conversions of the acid to iron sulfate and basic titanium sulfate results. Further objects and advantages of the invention will be obvious from the ensuing description:—

These advantageous results are obtainable in my invention by reason of my discovery that conversions depend upon (1) the rate and method of mixing the ilmenite sand and acid; (2) the time allowed for the reaction prior to the dissolving operation; (3) the use of excess theoretical amounts of ilmenite; (4) the maintenance of the acid in highly heated state prior to ore addition; and (5) the maintenance of the reacted mass in heated condition after reaction to permit so-called "curing".

Referring in detail to my novel process, it is to be noted that the concentration and temperature of the sulfuric acid employed must be regulated and controlled if best results are to be obtained. To this end, I preferably prepare the proper acid concentration, by mixing concentrated sulfuric acid with a more dilute acid. Preferably the concentrated acid comprises oleum, corresponding to about 104% $H_2SO_4$, although, if desired, the concentration may be varied considerably. The oleum is preferably mixed with by-product sulfuric acid, obtained as a result of hydrolysis of a titanium sulfate solution, although dilute acid from another source may be employed, if desired. The oleum and dilute acid are used in such proportions that the mixture contains from about 83-90% $H_2SO_4$, the concentration being so selected as to allow for any amount of water which may be present as moisture in the ore, and thus incur further dilution. On dilution of the concentrated acid, a rise in temperature results, the mixture having a temperature of substantially 165-185° C. Live steam is then injected into the diluted acid until its temperature is raised to at least 180° C. or to the boiling point. Preferably, however, a final acid temperature of from substantially 195° C.— 225° C. is employed, in order to obtain optimum benefits. The use of live steam in addition to serving the desired function of heating the acid to a desired temperature also serves to dilute the acid to some extent, and accordingly the proportion of weak waste acid employed for dilution of the concentrated acid should be taken into consideration with reference to the amount of heating necessary so that a final sulfuric acid concentration of below substantially 90% and of about 80–85% $H_2SO_4$ can be reached. More specifically, however, when dry ore is to be digested, the acid strength should be so adjusted as to obtain about 82–83% $H_2SO_4$ strength.

Upon adjustment of the acid to suitable concentration and temperature, controlled, gradual addition of the ore to the hot acid is then effected by means of a suitable and conventional feeding apparatus. On addition of the ore to the acid, the reaction proceeds spontaneously and without further addition of heat. The reaction is carried out in strong agitated pans or pots, since agitation is a necessary operation if a powdery product is to be realized. A large amount of heat will be evolved during the reaction, but this is dissipated by generation of steam. I have found it preferable to effect ore addition to the hot acid slowly and steadily, so regulating the addition that an extended period of about 15–20 minutes is consumed in doing so. While this range of time is suggested as preferable, it is obvious that this is subject to variance, depending to some extent upon the state of subdivision of the ore and its reactivity. Ilmenite sands vary in fineness from substantially 40 mesh to 100 mesh and consequently their reactivity also varies, due to the increased amount of exposed surface in the finer ore. Generally, it will be found that the more reactive the ore the shorter will be the addition time required, and that periods ranging from substantially 10–30 minutes may be required in effecting optimum conversions. Where, for instance, the ore is in a relatively finely divided state and highly reactive in character, addition may be effected within a period less than 10 minutes, although I have found that no less than substantially 5 minutes, nor more than substantially 40 minutes, should be consumed in effecting ore addition, regardless of the type or character of the particular ore.

After the ore has been added to the hot acid, the reaction proceeds and results eventually in a dry, powdery, brown mass consisting of sulfates of titanium, iron and impurities, as well as unsulfated ore and the accompanying gangue. I have found that the reaction continues for some time if the mass is kept hot, and that it will be highly advantageous for effecting more complete conversion, particularly of the acid, if this dry mass is not allowed to cool immediately, but is held at a relatively high temperature for an extended period of time. I prefer to maintain the temperature of the mass by piling it in large heaps or in pits and leaving it undisturbed for from about 3 to 36 hours. Preferably, I effect curing of the mass in its own heat for about 24 hours.

In order that the invention may be more clearly understood, the following illustrative example is given, which of course is to be taken as in no wise a limitation of the invention:—

*Example*

Two thousand pounds of oleum were added to five hundred pounds of 25% acid recovered from a subsequent step in the $TiO_2$ pigment process in an agitated container and steam was injected into the mixture until a temperature of 215° C. was reached. At this point, the acid strength was 83%. Seventeen hundred pounds of ilmenite sand of Indian origin containing 52% $TiO_2$ were then fed into the hot acid over a period of 17 minutes. The rate of adding the ilmenite was, in this case, below the average at the start and the rate was gradually increased as the reaction proceeded.

After twenty-five minutes, the attack mass attained a powdery condition, and it was then discharged from the attack receptacle into a curing pit. At this point the approximate analysis was as follows:—

| | Percent |
|---|---|
| $TiOSO_4$ | 30.0 |
| $FeSO_4$ | 15.3 |
| $Fe_2(SO_4)_3$ | 11.7 |
| Free $H_2SO_4$ | 12.1 |
| Unconverted ilmenite and slimes as $TiO_2$ | 9.0 |

After lying undisturbed for twenty-four hours in a large pile together with twenty similar attacks, the approximate analysis became:—

| | Percent |
|---|---|
| $TiOSO_4$ | 35.0 |
| $FeSO_4$ | 17.8 |
| $Fe_2(SO_4)_3$ | 12.5 |
| Free $H_2SO_4$ | 6.8 |
| Unconverted ilmenite and slimes as $TiO_2$ | 6.5 |

It is evident that the sulfuric acid was almost entirely neutralized, and it is noted that the curing step reduced the amount of excess acid by almost one-half.

My invention is most advantageously applicable to the treatment of natural, unpulverized ilmenite sand of about 40–100 mesh. In accordance with my invention, it will be found unnecessary to pretreat this material or effect its further pulverization or division, or that it be subjected to drying previous to treatment. The ore may be used in an amount in excess of that required to react with the acid. Generally, I prefer to employ between about 1.2 and 1.3 parts of $H_2SO_4$ (100% basis) to each part of ilmenite by weight.

From the foregoing, it will be obvious that by a combination of the simple conditions set forth above it will be possible to obtain almost complete conversions of the acid to iron sulfates and basic titanium sulfate. To obtain optimum results, the various conditions must be used together; for instance, the mass would cure much less if the acid mass had been maladjusted as regards strength and temperature, or if the ore introduction had been made in too short a time. The process thus affords the direct and satisfactory employment of coarse beach sand ilmenite without necessitating use of expensive drying or grinding media or added conversion catalysts. This alone induces a great economic saving in materials as well as plant equipment. Similarly, my critical and essential feature of slowly and controlledly adding relatively coarse ilmenite ore to the highly heated acid effectively departs from prior processes, requiring that the acid be circulated through the ore. In such processes the use of beach sand origin ilmenite is negatived unless grinding is resorted to, due to the fact that the particle size of the ore is too fine to permit free liquor percolation and not sufficiently fine to remain in suspension during the reaction.

I claim as my invention:—

1. A process for the recovery of titanium values from titaniferous ores comprising initially adjusting attack sulfuric acid by dilution and heating to controlled percentage concentration and elevated temperature, and then slowly adding during a period ranging from 5 to 40 minutes an excess amount of natural titaniferous ore to said heated acid.

2. A process for decomposing a titanium ore comprising diluting concentrated sulfuric acid and elevating its temperature, slowly adding an excess of ore thereto, and curing the reaction mass at an elevated temperature and in the absence of extraneous heat for no less than about 3 hours.

3. A process for decomposing a titanium ore, comprising diluting concentrated sulfuric acid to a strength ranging from about 80-90% $H_2SO_4$, maintaining said acid at a temperature above 180° C., adding an excess of the ore to the heated acid within a period of time not substantially less than 5 minutes, and curing the reaction mass in its own heat for about 3 hours.

4. A process for decomposing a titanium ore, comprising concentrating sulfuric acid to about 80-85% $H_2SO_4$, elevating the temperature of said acid to between substantially 195°-225° C., adding an excess of ore thereto in a period of time not substantially less than about 5 minutes, and curing the reaction mass in its own heat for about 3-36 hours.

5. A process for decomposing a titanium ore to recover titanium values therefrom, comprising diluting concentrated sulfuric acid to a strength of about 80-85% $H_2SO_4$, elevating and maintaining the temperature of said acid above 180° C., slowly adding an excess of the ore to the heated acid in a period of time ranging from substantially 5-40 minutes, and curing the reaction mass in its own heat for at least 3 hours.

6. A process for decomposing a titanium ore to recover titanium values therefrom, comprising diluting concentrated sulfuric acid to a strength of about 80-85% $H_2SO_4$, elevating and maintaining the temperature of said acid above 180° C., slowly adding an excess of the ore to the heated acid in a period of time ranging from substantially 10-30 minutes, and curing the reaction mass in its own heat for at least 3 hours.

7. A process for decomposing a titanium ore to recover titanium values therefrom, comprising concentrating sulfuric acid to about 80-85% $H_2SO_4$, elevating the temperature of said acid to about 195-225° C., slowly adding an excess of ore to the heated acid within a period of time ranging from substantially 5-40 minutes, and curing the reaction mass in its own heat for about 3-36 hours.

8. A process for decomposing a titanium ore to recover titanium values therefrom, comprising concentrating sulfuric acid to about 80-85% $H_2SO_4$, elevating the temperature of said acid to about 195-225° C., slowly adding an excess of ore to the heated acid within a period of time ranging from substantially 15-20 minutes, and curing the reaction mass in its own heat for about 24 hours.

9. A process for decomposing a natural, unground ilmenite sand to recover titanium values therefrom, comprising diluting concentrated sulfuric acid to about 80-85% $H_2SO_4$, elevating the temperature of said acid to above substantially 180° C., slowly adding an excess of ilmenite to the heated acid, and curing the reaction mass at an elevated temperature for no less than 3 hours.

10. A process for decomposing a natural, unground ilmenite sand to recover titanium values therefrom, comprising diluting concentrated sulfuric acid to a dilution of about 83% $H_2SO_4$, heating and maintaining the diluted acid to a temperature above substantially 180° C., adding an excess of ilmenite to the heated acid in a period of time not substantially less than 5 minutes, and curing the reaction mass in its own heat for about 3-36 hours.

11. A process for decomposing a natural, unground ilmenite sand to recover titanium values therefrom, comprising diluting concentrated sulfuric acid to a dilution of about 83% $H_2SO_4$, heating and maintaining the diluted acid to a temperature ranging from substantially 195° C.-225° C., adding an excess of ilmenite to the heated acid in a period of time not substantially less than 5 minutes, and curing the reaction mass in its own heat for about 24 hours.

12. A process for decomposing a natural, unground ilmenite sand to recover titanium values therefrom, comprising diluting concentrated sulfuric acid with a weak waste acid, heating the diluted acid with live steam to effect a final dilution of about 80-85% $H_2SO_4$ and a temperature above 180° C., slowly adding an excess of the ilmenite to the diluted hot acid in a period of time ranging from substantially 15-20 minutes and curing the reaction mass at an elevated temperature for no less than about 3 hours.

13. A process for decomposing a natural, unground ilmenite sand to recover titanium values therefrom, comprising diluting concentrated sulfuric acid with a weak waste acid, heating the diluted acid with live steam to effect a final dilution of about 80-85% $H_2SO_4$ and a temperature of about 195-225° C., slowly adding an excess of the ilmenite to the diluted hot acid in a period of time ranging from substantially 15-20 minutes and curing the reaction mass at an elevated temperature for about 3-24 hours.

14. A process for decomposing a natural, unground ilmenite sand to recover titanium values therefrom, comprising mixing concentrated sulfuric acid with a dilute waste acid, supplying additional heat to the mixture by injecting live steam therein to effect a final concentration of the mixture to about 83% $H_2SO_4$ and a final temperature of between 195° C. and 225° C., thence slowly adding an excess of the ore to the highly heated acid in a time period of not substantially less than about 15-20 minutes, and curing the reaction mass in its own heat for about 24 hours.

IGNACE J. KRCHMA.